United States Patent

[11] 3,538,823

| [72] | Inventor | Karl Wagner<br>Ottobrunn near Munich, Germany |
|---|---|---|
| [21] | Appl. No. | 725,341 |
| [22] | Filed | April 30, 1968 |
| [45] | Patented | Nov. 10, 1970 |
| [73] | Assignee | Agfa-Gevaert Aktiengesellschaft<br>Leverkusen, Germany |
| [32] | Priority | May 5, 1967 |
| [33] | | Germany |
| [31] | | A 55,630 |

[54] EXPOSURE CONTROL FOR PHOTOGRAPHIC CAMERAS
9 Claims, 1 Drawing Fig.

[52] U.S. Cl. ............................................. 95/10, 95/64
[51] Int. Cl. ........................................... G03b 7/08
[50] Field of Search ............................... 95/10(C), 53(E), 64, 64(C)

[56] References Cited
UNITED STATES PATENTS

| 3,072,028 | 1/1963 | Lange | 95/10(C)UX |
| 3,183,814 | 5/1965 | Vess et al. | 95/64 |
| 3,286,610 | 11/1966 | Fahlenberg | 95/10(C)UX |

*Primary Examiner*—John M. Horan
*Assistant Examiner*—Joseph F. Peters, Jr.
*Attorney*—Michael S. Striker ABSTRACT: An exposure control for photographic cameras wherein the shutter is adjustable by a delay circuit which includes a photosensitive resistor located behind an auxiliary diaphragm whose aperture size varies as a function of the aperture size in the main diaphragm. The latter is adjustable by an exposure meter, either as a function of scene brightness or as a function of the resistance of one of several fixed resistors which can be substituted for a second photosensitive receiver in the circuit of the exposure meter when the user wishes to make exposures with a flashgun or with an electronic flash. The resistances of fixed resistors indicate various light values. A mask is movable by hand to change the sensitivity of the second photosensitive resistor by controlling the amounts of scene light which can reach the second resistor, and this mask also actuates a switch which can connect the second photosensitive resistor or a selected fixed resistor into the circuit of the exposure meter.

Patented Nov. 10, 1970
3,538,823
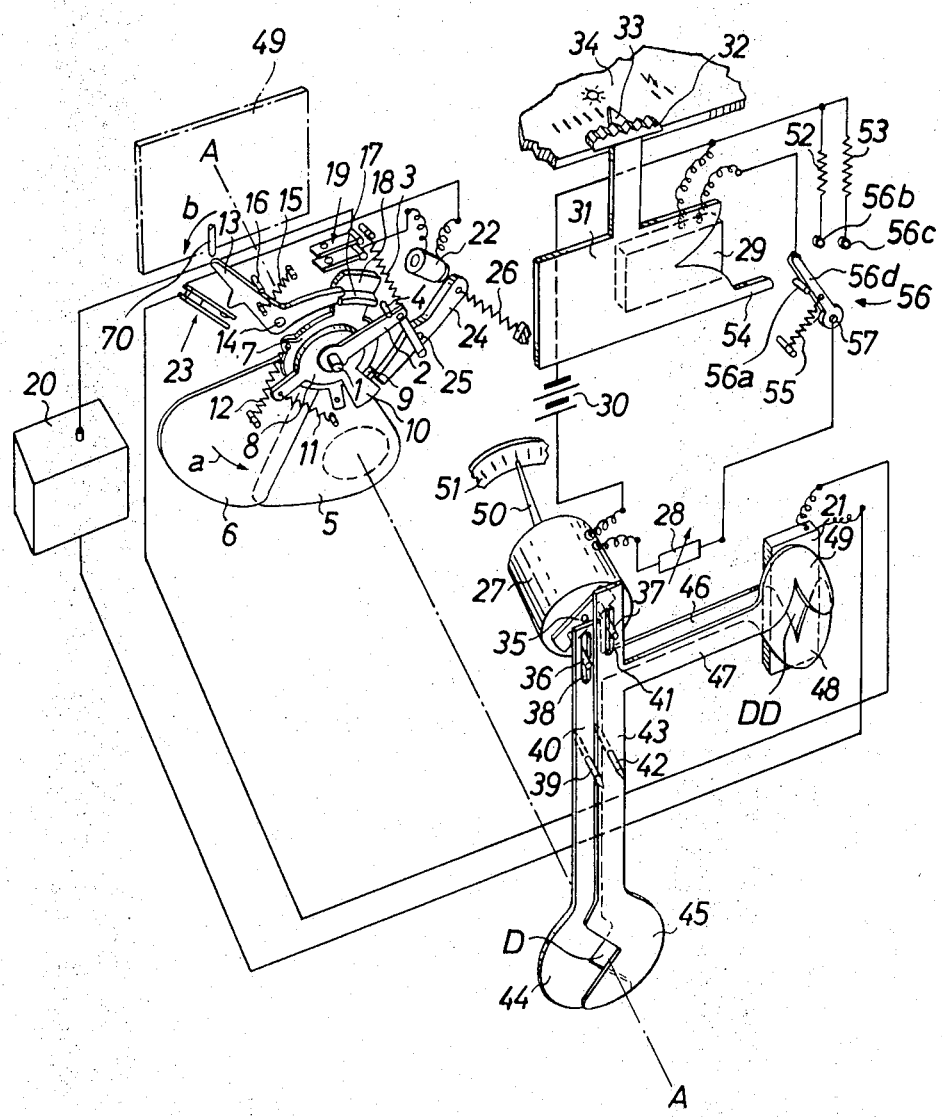
INVENTOR.
KARL WAGNER
BY Michael S Striker
Attorney

EXPOSURE CONTROL FOR PHOTOGRAPHIC CAMERAS

BACKGROUND OF THE INVENTION

The present invention relates to photographic cameras in general, and more particularly to exposure controls for still cameras or motion picture cameras. Still more particularly, the invention relates to improvements in exposure controls of the type wherein the exposure time can be varied as a function of scene brightness.

An advantage of exposure controls which can change the exposure time as a function of scene brightness is that their shutters can furnish a wide range of exposure times, for example, from 16 seconds to one five-hundreths second. Certain conventional exposure controls of this character are designed to change the exposure time as a function of scene brightness and as a function of manually selected aperture size. A drawback of such exposure controls is that the user must select the aperture size, i.e., an exposure value whose influence on the quality of exposures is not readily understood by beginners or by inexperienced photographers. Furthermore, such exposure controls do not have any means for indicating to the user the exact exposure time which has been set as a function of scene brightness and as a function of the manually selected aperture size.

Certain other types of known exposure controls include an electrical delay circuit for the shutter and an exposure meter. The latter comprises a needle which adjusts the diaphragm as a function of scene brightness, i.e., as a function of a photosensitive receiver in the delay circuit. The resistance of the receiver also determines the exposure time. The needle is adjacent to a scale which indicates the exposure times. The galvanometer of the exposure meter is turnable in its entirety and can be adjusted by resorting to a scale which indicates various depths of field. A drawback of the just described exposure control is that changes in scene brightness subsequent to adjustment of the diaphragm bring about changes in the exposure time. Thus, and if the scene brightness decreases very suddenly, the automatically selected exposure time might be much too long for exposures with a camera which is held by hand. Another drawback of this exposure control is that it is not possible to change the aperture size independently of the exposure time or vice versa because the exposure time is always a function of scene brightness.

SUMMARY OF THE INVENTION

It is an object of my invention to provide an exposure control for photographic cameras wherein the exposure time can be preselected at the will of the user and wherein the aperture size can be determined automatically as a function of scene brightness.

Another object of the invention is to provide an exposure control which can be used in cameras for making exposures in daylight or for making exposures in artificial light with a single type or with two or more types of illuminating arrangements.

A further object of the invention is to provide a camera wherein the user can determine the exposure time at will and wherein the user can also determine the aperture size independently of scene brightness.

The improved exposure control comprises adjustable diaphragm means arranged to furnish a plurality of aperture sizes, exposure meter means of variable sensitivity operatively connected with the diaphragm means to determine the aperture size as a function of scene light or as a function of the light value of one or more illuminating arrangements which can be used with the camera embodying the exposure control, adjustable shutter means arranged to furnish a plurality of exposure times, an adjustable electrical delay circuit associated with the shutter means and comprising photosensitive receiver means which is exposed to light and whose resistance determines the exposure time and is a function of the adjustment of the diaphragm means (i.e. a function of the aperture size), and regulating means for adjusting the sensitivity of the exposure meter means. The exposure control preferably further includes manually operated selector means connected with the regulating means for movement between a plurality of positions each of which corresponds to a different exposure time, and scale means having graduations indicating various exposure times. The scale means is adjacent to the selector means to facilitate the selection of desired exposure time.

The exposure meter means comprises a second electric circuit which may include second photosensitive receiver means, at least when the camera embodying the exposure control is used in daylight. The regulating means may comprise an opaque mask which is movable by hand to change the amounts of scene light which can reach the second receiver means and to thereby influence the aperture size and the exposure time, the exposure time being a function of the resistance of the first photosensitive receiver means (i.e., a function of the aperture size).

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIG. is a diagrammatic exploded perspective view of an exposure control which embodies the invention.

DESCRIPTION OF THE PREFERRED EMBODIMENT

The illustrated exposure control comprises an adjustable shutter having a shaft 1 which is rotatable in the shutter housing and is rigid with a cocking lever 2. The latter is biased against a fixed stop 4 by a return spring 3. The shaft 1 further supports two turnable setting rings 7, 8 each of which is coupled to one of two shutter blades 5, 6. The rings 7, 8 are provided with bent-over lugs or like projections (not shown) extending into recesses of the respective shutter blades 5, 6. The leading setting ring 7 has a projection 9 which extends into the path of movement of the cocking lever 2 and the projection 9 can entrain a projection 10 on the trailing setting ring 8 when the cocking lever 2 is turned against the opposition of the spring 3 to cock the shutter by turning the rings 7, 8 and the respective shutter blades 5, 6 in a clockwise direction to the cocked positions which are shown in the drawing. The setting rings 7, 8 are respectively biased to uncocked positions by helical return springs 12, 11.

The leading setting ring 7 has a second projection 17 which is engaged by one arm of a first blocking lever 13 when the ring 7 assumes its cocked position. The lever 13 is turnable on a fixed shaft 14 and is biased by a spring 15 which urges it against a fixed stop 16. This is the blocking position of the lever 13; the lever then holds the leading setting ring 7 against rotation toward uncocked position (arrow a). The ring 7 is further provided with an actuating member or trip 18 which closes a control switch 19 when the lever 13 is caused to turn in the direction indicated by arrow b. The control switch 19 is normally open and forms part of an adjustable electrical delay circuit which further comprises a switching unit 20 of known design, for example, a switching unit which comprises one or more transistors and an R-C unit and is connected with a suitable source of electrical energy. The delay circuit also includes a photoelectric receiver 21 an electromagnet 22, and a master switch 23. The electromagnet 22 serves to rotate a second blocking lever 24 which engages the projection 10 when the trailing setting ring 8 assumes the illustrated cocked position. The blocking lever 24 is turnable on a shaft 25 and is biased by a helical spring 26 which opposes the action of the electromagnet 22. When the electromagnet 22 is energized, it overcomes the opposition of the spring 26 and attracts the blocking lever 24 so that the latter releases the projection 10 and allows the trailing setting ring 8 to turn toward uncocked position (arrow *a*). When in cocked position, the leading setting ring 7 maintains the leading shutter blade 5 in a closed position in which the blade 5 extends across a path A-A along which the scene light can reach an unexposed film frame in a film window 49.

The exposure control further comprises an exposure meter which includes a light meter here shown as a moving coil instrument 27 having an output portion 35 provided with two motion-transmitting pins 36, 37. The electric circuit of the exposure meter includes a variable resistor 28, a photosensitive receiver 29, and a battery 30 or another suitable source of electrical energy. The receivers 21, 29 are preferably photoelectric resistors mounted on or behind the front wall of the camera which embodies the exposure control so as to be exposed to scene light. The coil of the instrument 27 is normally connected in series with the parts 28, 29 and 30. The exposure control also comprises a regulating device which can adjust the sensitivity of the exposure meter; this regulating device comprises an opaque mask 31 which is movable between a plurality of positions in each of which it permits scene light to reach a smaller or larger portion of the receiver 29. The mask 31 can be replaced by other types of regulating devices, for example, by a filter or by an auxiliary diaphragm. It is connected with a manually operated selector 32 which is reciprocable in suitable ways (not shown) and is provided with a pointer 33 movable along a fixed scale 34 which is graduated to indicate various exposure times and various light values. The graduations are arranged in two groups one of which indicates exposure times and is adjacent to a sun symbol (exposures in daylight) and the other of which indicates light values and is adjacent to a thunderbolt symbol (exposures in artificial light). The variable resistor 28 is adjustable to account for one or more additional factors which can influence the exposure, for example, the filter factor and/or the film speed. It is clear that the resistor 28 can be replaced by a second mask (not shown) which is movable with reference to the receiver 29 to adjust the exposure meter as a function of the manually selected exposure time and/or as a function of the film speed. Furthermore, the exposure meter can be adjusted by a variable resistor (replacing the receiver 29) to account for the manually selected exposure time.

The output portion 35 of the moving coil instrument 27 resembles a bridge and carries the aforementioned motion transmitting pins 36, 37 which extend into elongated slots 38, 41 respectively provided in the upper end portions of two diaphragm vanes 40, 43 which are respectively fulcrumed at 39, 42. The lower end portions 44, 45 of the vanes 40, 43 define an aperture D whose size is a function of the angular position of the output portion 35. The aforementioned path A-A extends through the aperture D.

The vanes 40, 43 constitute an adjustable diaphragm and are respectively provided with arms 46, 47 which carry vanes 48, 49 forming an auxiliary diaphragm in front of the photosensitive receiver 21 in the delay circuit. This auxiliary diaphragm constitutes a second regulating device which adjusts the delay circuit as a function of the aperture size. It is clear that the auxiliary diaphragm including the vanes 48, 49 could be replaced by another adjustable regulating device for the delay circuit, for example, by a mask similar to the mask 31 or by a movable filter. Regardless of the exact design of the regulating device for the delay circuit, the admission of scene light to the photosensitive receiver 21 is regulated in the same way as the admission of scene light to the film in the window 49 by way of the main diaphragm including the vanes 40, 43. This being so, it is equally possible to deflect some of the light which passes through the main diaphragm including the vanes 40, 43 to impinge against the photosensitive receiver 21 of the delay circuit, as long as the amount of scene light which reaches the resistor 21 varies in the same way as the amount of light which is admitted to film in the window 49 by way of the aperture D. The auxiliary diaphragm 48, 49 is then omitted; such solution is particularly advantageous when the exposure control comprises a shutter diaphragm which is located directly in front of the film.

The moving coil instrument 27 is further provided with a second output portion or index 50 which is adjacent to a fixed scale 51. The latter has graduations which indicate different aperture sizes. The scale 51 is mounted in a position in which it is readily visible so that the user of the camera can read the aperture size which is selected by the exposure meter.

The exposure control also comprises two or more fixed resistors 52, 53 which can be connected in the circuit of the exposure meter as a substitute for the photosensitive receiver 29. The resistor 52 or 53 replaces the receiver 29 when the user decides to manually select the aperture size for a particular exposure or for a particular series of exposures. The circuit of the exposure meter comprises a three-way switch 56 having three fixed contacts 56*a*, 56*b*, 56*c* which are respectively connected with the receiver 29 and resistors 52, 53 and a movable contact 56*d* which is pivoted at 57 and is biased by a helical spring 55 so that it normally engages the fixed contact 56*a*. The receiver 29 is then connected in the circuit of the exposure meter. The regulating mask 31 comprises an actuating member or pusher 54 which moves the contact 56*d* into engagement with the contact 56*b* or 56*c* when the pointer 33 registers with one of the graduations on the right-hand portion of the scale 34 (adjacent to the thunderbolt symbol).

The operation is as follows:

Prior to making an exposure with automatic selection of the aperture size, the user selects an appropriate exposure time by way of the selector 32, *i.e.*, the index 33 is moved into registry with one of the graduations which are adjacent to the sun symbol on the scale 34. This adjusts the sensitivity of the circuit in the exposure meter because the regulating mask 31 then overlies a predetermined portion of the photosensitive receiver 29. Thus, the position of the output portion 35 and index 50 changes even if the intensity of scene light remains unchanged because a change in the position of the selector 32 invariably brings about a change in the resistance of the receiver 29. The output portion 35 turns the vanes 40, 43 by way of the pins 36, 37 to adjust the size of the aperture D so as to account for the selected exposure time. The vanes 40, 43 turn in opposite directions and cause their arms 46, 47 to change the size of the aperture DD which is defined by the vanes 48, 49 of the auxiliary diaphragm. Thus, the resistance of the resistor 21 in the delay circuit is changed as a function of adjustment of the selector 32. The adjustment in the size of the aperture DD is proportional to the adjustment in the size of the aperture D. The receiver 21 preferably constitutes one element of the aforementioned R-C unit in the switching unit 20, *i.e.*, that element which determines the exposure time.

In order to make the exposure, the user depresses a shutter release trigger 70 which causes the blocking lever 13 to turn in the direction indicated by arrow *b* so that the lever 13 moves away from the projection 17 and allows the leading setting ring 7 to turn under the bias of the return spring 12 (arrow *a*). The ring 7 entrains the leading shutter blade 5 and moves the latter away from the path A-A so that scene light can pass through the aperture D and impinges against the film frame in the window 49. Even before the trigger 70 disengages the lever 13 from the projection 17 of the leading setting ring 7, it causes the lever 13 to close the master switch 23 so as to prepare the delay circuit for operation.

While the leading setting ring 7 turns in the direction indicated by arrow *a*, its trip 18 closes the control switch 19 to thus complete the delay circuit. This circuit energizes the electromagnet 22 with a delay which is a function of the resistance of the photosensitive receiver 21, and the electromagnet 22 then attracts its armature (blocking lever 24) so that the latter moves away from the projection 10 and allows the trailing setting ring 8 to turn (arrow *a*) under the action of the return spring 11. The ring 8 turns the trailing shutter blade 6 in the same direction and causes this blade to move across the path A-A and to thus complete the exposure.

In order to make an exposure with artificial illumination of the subject, the user moves the selector 32 so as to place the pointer 33 into registry with a graduation in the right-hand portion of the scale 34, depending on the type of the illuminating arrangement, e.g., a flash unit or an electronic flash. Though the drawing shows an exposure control which can be used with two types of illuminating arrangements, it is equally possible to provide more than two fixed resistors (52, 53) and to provide the switch 56 with a larger number of fixed contacts. For example, the exposure control can be designed for use with two types of flash units and with two or more types of electronic flash devices. The resistance of each of the fixed resistors 52, 53 is indicative of the light value of a different illuminating arrangement. These resistances are preferably selected in such a way that the exposure control provides an aperture D of medium size for a film of average speed. It is also possible to provide a separate selector which can connect the resistors 52, 53 (and eventually one or more additional fixed resistors) into the circuit of the exposure meter by observing a separate scale which is suitably graduated to indicate various positions of the second selector. It is equally possible to adjust the position of the selector 32 when its pointer 33 already registers with one of the graduations on the right-hand portion of the scale 34 so that such adjustments account for different distances from the subject during an exposure with artificial illumination. Still further, the fixed resistors 52, 53 can be replaced by a potentiometer, particularly if the selector 32 is adjustable when its pointer 53 registers with a graduation or with a set of graduations in the right-hand portion of the scale 54. In other words, each of the two graduations shown in the right-hand portion of the scale 54 can be replaced by a set of graduations which indicate different distances from the subject when the exposure control is used in connection with a certain type of illuminating arrangement.

When the user completes the adjustment of the selector 32, i.e., when the receiver 29 is replaced by the resistor 52 or 53, the trigger 70 is depressed again to move the blocking lever 13 in the direction indicated by arrow b. The delay circuit is prepared for operation when the lever 13 closes the master switch 23 and the delay circuit is completed when the leading setting ring 7 closes the control switch 19. The total amount of scene light which can reach the film frame in the window 49 depends on the empirically determined guide member of the illuminating arrangement (resistor 52 or 53) as well as on the intensity of light which is reflected from the subject or scene and impinges on the receiver 21 in the delay circuit. As stated before, this receiver 21 constitutes that element of the delay circuit which determines the exposure time. The size of the aperture D depends solely on the resistance of the resistor 52 or 53 when the exposure is made in artificial light, i.e., when the receiver 29 is disconnected from the circuit of the exposure meter. The exposure is completed when the electromagnet 22 is energized and disengages the blocking lever 24 from the projection 10 of the trailing setting ring 8 so that the trailing shutter blade 6 can move across the path A-A.

An important advantage of the selector 32 and scale 34 is that the user need not carry out any calculations involving the light values of various illuminating arrangements when the camera embodying the improved exposure control is used for making exposures in artificial light. If the right-hand portion of the scale 34 is provided with sets of graduations wherein the sets indicate various light values and wherein the graduations of each set indicate various distances from the subject for a particular light value, the adjustment of the exposure control for operation in artificial light at a desired distance from the subject is even simpler. An additional feature of the exposure control is that the selector 32 can be manipulated to adjust the exposure time and also to select the aperture size of the main diaphragm when the camera embodying the exposure control is used in artificial light, i.e., when the receiver 29 is disconnected from the circuit of the exposure meter.

Still another important advantage of the exposure control is that, if an inexperienced user selects a less satisfactory aperture size, the exposure control compensates for such error by appropriate adjustment of the exposure time. Moreover, and even though the exposure control can furnish a large number of combinations of aperture sizes and exposure times, the angular displacement of the index 51 is relatively small because this index merely indicates various aperture sizes. The receiver 21 replaces complicated variable resistors or large groups of fixed resistors which are used in certain conventional exposure controls.

This improved exposure control is susceptible of many additional modifications without departing from the spirit of the present invention. For example, the exposure control may utilize a simpler or a more sophisticated shutter. Also, the delay circuit which is shown in the drawing can be replaced by other suitable delay circuits of known design, also with such delay circuits which do not utilize the switching unit 20.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In an exposure control for photographic cameras, a combination comprising adjustable diaphragm means arranged to furnish a plurality of aperture sizes; adjustable shutter means arranged to furnish a plurality of exposure times; an adjustable delay circuit associated with said shutter means and comprising first photosensitive receiver means which is exposed to light and whose resistance determines the exposure time and is a function of the adjustment of said diaphragm means; exposure meter means of variable sensitivity operatively connected with said diaphragm means to determine the aperture size, said exposure meter means comprising a second electric circuit including second photosensitive receiver means which is exposed to scene light; and regulating means for adjusting the sensitivity of said exposure meter means, said regulating means comprising a manually operated opaque mask which is movable to a plurality of positions to thereby regulate the amounts of scene light which can reach said second receiver means.

2. A combination as defined in claim 1, further comprising second regulating means including an adjustable auxiliary diaphragm arranged to furnish a plurality of aperture sizes for admission of scene light to said first receiver means as a function of the adjustment of said first-mentioned diaphragm means.

3. A combination as defined in claim 1, wherein said exposure meter means comprises a light meter having an index movable to a plurality of positions corresponding to various aperture sizes and a scale adjacent to said index and graduated to furnish readings indicating the aperture sizes furnished by said diaphragm means.

4. A combination as defined in claim 1, wherein said diaphragm means comprises a plurality of vanes and said exposure meter means comprises a light meter having an output portion directly coupled with at least one of said vanes.

5. In an exposure control for photographic cameras, a combination comprising adjustable diaphragm means arranged to furnish a plurality of aperture sizes; exposure meter means of variable sensitivity operatively connected with said diaphragm means to determine the aperture size; adjustable shutter means arranged to furnish a plurality of exposure times; an adjustable delay circuit associated with said shutter means and comprising photosensitive receiver means which is exposed to light and whose resistance determines the exposure time and is a function of the adjustment of said diaphragm means; regulating means for adjusting the sensitivity of said exposure meter means, said regulating means being movable by hand between a plurality of positions each of which is indicative of a different exposure time; and scale means adjacent to said regulating means and graduated to indicate various exposure times and to thus facilitate the selection of desired exposure time.

6. In an exposure control for photographic cameras, a combination comprising adjustable diaphragm means arranged to furnish a plurality of aperture sizes; adjustable shutter means arranged to furnish a plurality of exposure times; an adjustable delay circuit associated with said shutter means and comprising photosensitive receiver means which is exposed to light and whose resistance determines the exposure time and is a function of the adjustment of said diaphragm means; exposure meter means of variable sensitivity operatively connected with said diaphragm means to determine the aperture size, said exposure meter means comprising a second electric circuit, a photosensitive receiver element exposed to scene light, at least one resistor element, and switch means for selectively connecting one of said elements into said second circuit so that the aperture size is a function of scene light when said receiver element is connected in said second circuit and that the aperture size is a function of the resistance of said resistor element when the latter is connected in said second circuit; and regulating means for adjusting the sensitivity of said exposure meter means.

7. A combination as defined in claim 6, wherein said switch means is controlled by said regulating means.

8. A combination as defined in claim 7, further comprising manually operated selector means connected with said regulating means and provided with pointer means, and scale means adjacent to said pointer means and provided with graduations indicating various positions of said regulating means and said switch means.

9. A combination as defined in claim 8, wherein said scale means comprises two sets of graduations, said pointer means being in registry with a graduation of one of said sets when said switch means connects the receiver element into said second circuit and said pointer means registering with a graduation of the other set when said switch means connects said resistor element into said second circuit.